No. 689,894. Patented Dec. 31, 1901.
G. A. LUTZ.
ELBOW FOR CONDUITS FOR ELECTRIC WIRES.
(Application filed May 23, 1901.)
(No Model.) 2 Sheets—Sheet 1.
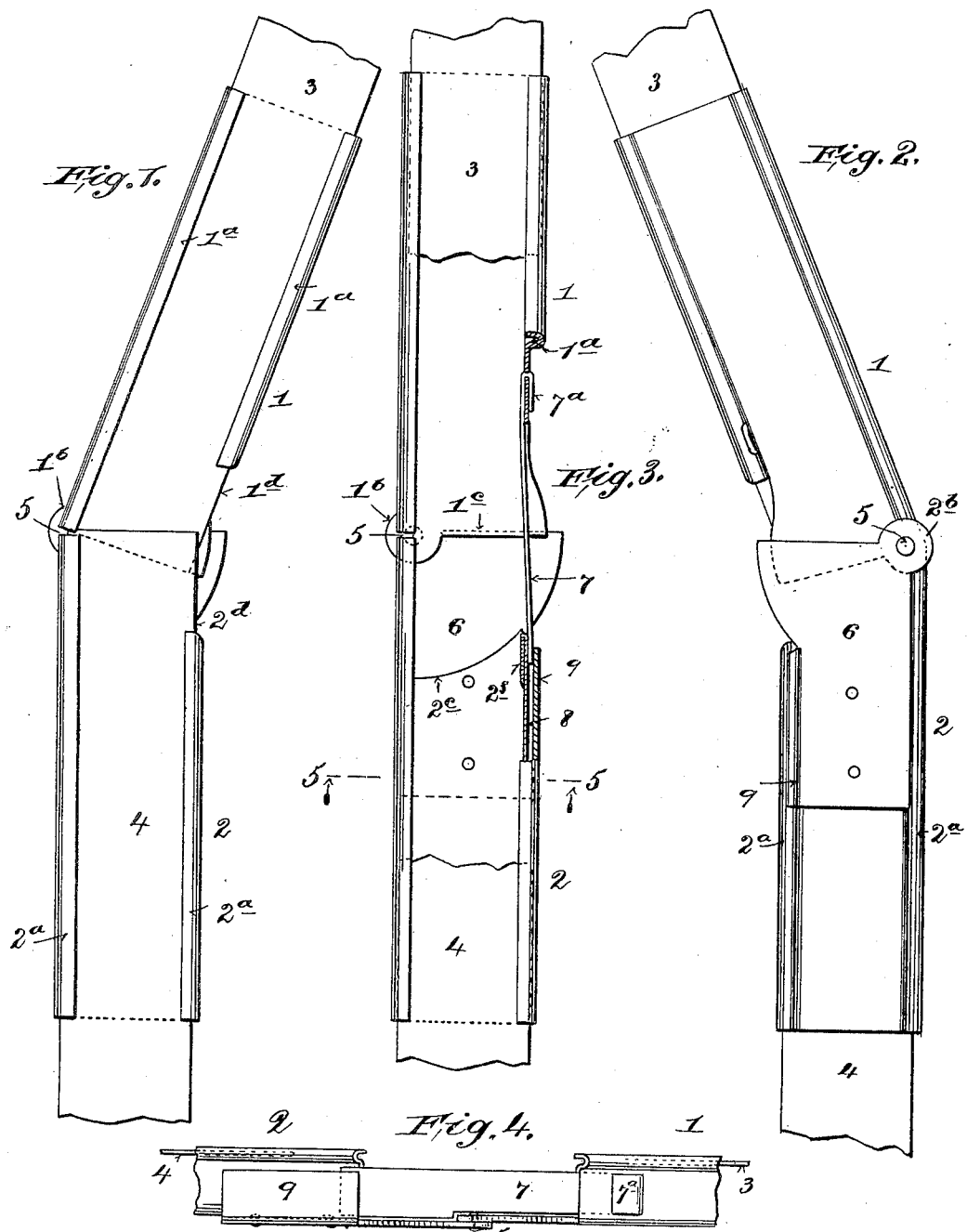

No. 689,894. Patented Dec. 31, 1901.
G. A. LUTZ.
ELBOW FOR CONDUITS FOR ELECTRIC WIRES.
(Application filed May 23, 1901.)
(No Model.) 2 Sheets—Sheet 2.
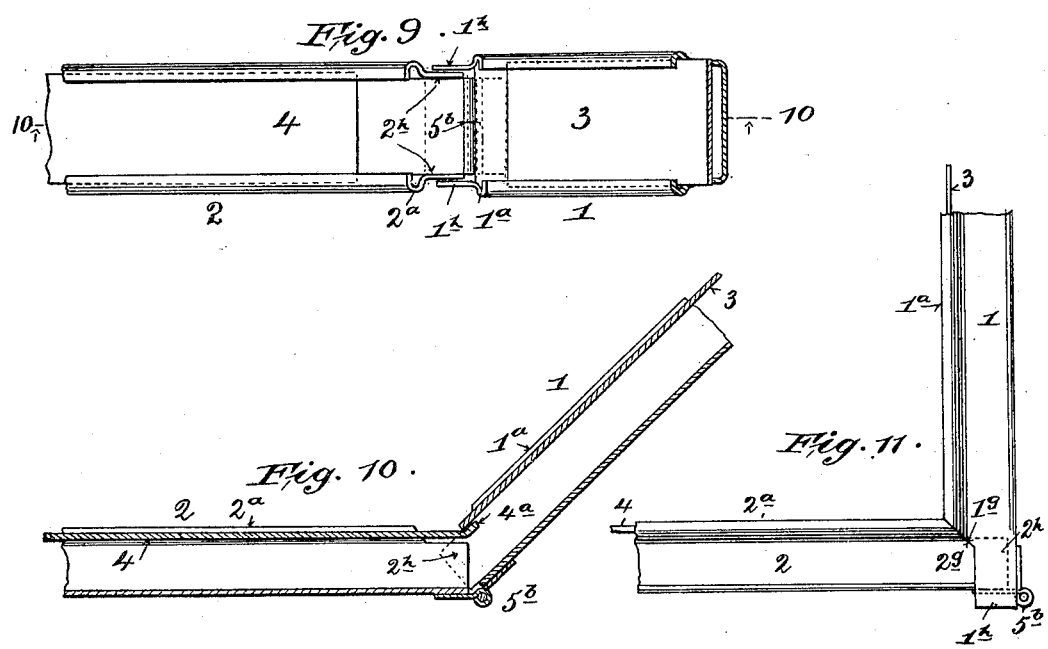
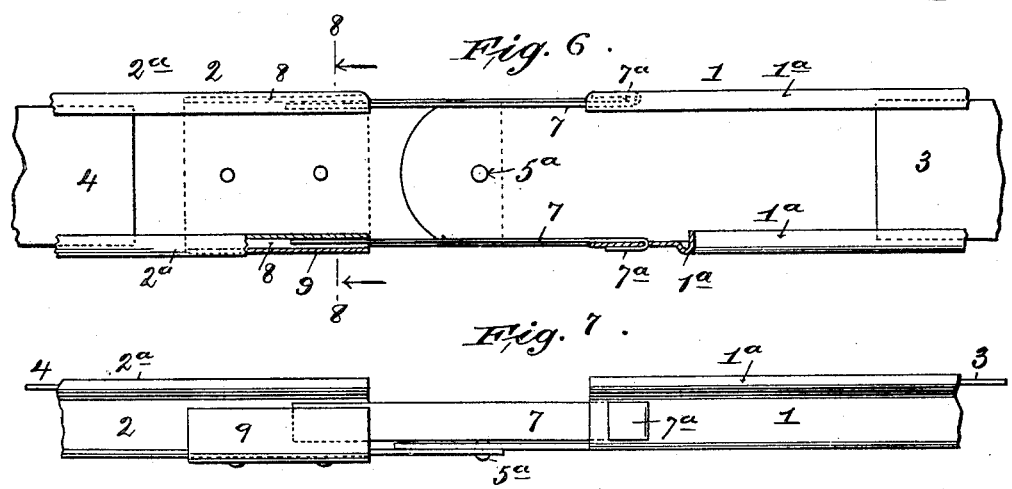
Witnesses;
C. W. Benjamin
M. Manning
Inventor,
Geo. A. Lutz
by T. F. Bourne
his atty
THE NORRIS PETERS CO., PHOTO-LITHO., WASHINGTON, D. C.

UNITED STATES PATENT OFFICE.

GEORGE A. LUTZ, OF BROOKLYN, NEW YORK, ASSIGNOR OF ONE-HALF TO EMMETT D. PAGE, OF NEW YORK, N. Y.

ELBOW FOR CONDUITS FOR ELECTRIC WIRES.

SPECIFICATION forming part of Letters Patent No. 689,894, dated December 31, 1901.

Application filed May 23, 1901. Serial No. 61,508. (No model.)

*To all whom it may concern:*

Be it known that I, GEORGE A. LUTZ, a citizen of the United States, and a resident of New York city, borough of Brooklyn, State of New York, have invented certain new and useful Improvements in Elbows for Conduits for Electric Wires, of which the following is a specification.

My invention relates to improvements in elbows more particularly adapted for use in conjunction with conduits for electric wires that are provided with removable covers; and the object of my invention is to provide improved means for enabling wires to be passed around corners or at an angle to the line of the main part of the conduit.

In carrying out my invention I provide an elbow which comprises a pair of members provided with channels to receive wires and with covers for said channels, and said members are hinged or pivoted together, so as to be placed at desired angles to each other, and means are also provided for keeping closed the cut-away parts of the members at the adjacent portions thereof, so that the wires will be concealed, notwithstanding the various positions to which the members of the elbow may be adjusted.

The invention further comprises the novel details of improvement that will be more fully hereinafter set forth, and then pointed out in the claims.

Reference is to be had to the accompanying drawings, forming part hereof, wherein—

Figure 1 is a face view of an elbow embodying my invention looking upon the covers thereof. Fig. 2 is a similar view illustrating the reverse side of the elbow shown in Fig. 1. Fig. 3 is a face view of the elbow, part being broken away. Fig. 4 is a detail side view looking from the right in Fig. 3. Fig. 5 is a cross-section on the line 5 5 in Fig. 3. Fig. 6 is a face view showing provision to enable the members of the elbow to be swung to opposite sides of the longitudinal line thereof. Fig. 7 is a side view thereof. Fig. 8 is a cross-section on the line 8 8 in Fig. 6. Fig. 9 is a face view of an elbow the members of which are movably connected, so that they may swing at right angles to the line of swinging movement illustrated in the preceding figures. Fig. 10 is a section on the line 10 10 in Fig. 9, and Fig. 11 is a side view showing the members of the elbow bent at right angles to each other.

In the accompanying drawings similar numerals of reference indicate corresponding parts in the several views.

The numerals 1 2 indicate the main members of the elbow, which are shown provided with a channel to receive electric wires, and having covers 3 4, forming a substantially closed conduit. In the form I have shown the members 1 2 are preferably made of sheet metal rolled or bent to the desired shape and having at the outer edges of their side walls longitudinally-disposed grooves $1^a$ $2^a$, which are respectively opposed to each other to receive the respective edges of the covers, so that the latter may slide therein, the material of the sides thus forming webs that lie under and over the adjacent edges of the cover. The two members 1 2 of the elbow are hinged or pivoted together, so that they may be placed in a straight line, as in Figs. 3 and 6, or turned to a desired angle, as the necessities may require, provision being made to maintain closed the openings that would occur at the cut-away parts of the members adjacent to the hinged ends thereof, the adjacent ends of the covers 3 4 also being adapted to overlap. In Figs. 1 to 5, inclusive, I have shown the two members 1 2 hinged or pivoted together, as at 5, the pivotal point of the members being shown at one side thereof, so that they may swing or be turned from the alined position shown in Fig. 3 to a position at right angles thereto and to any intermediate angle. In said figures the members 1 2 are shown provided with lugs $1^b$ $2^b$, respectively, that receive the pivot 5. The lug $2^b$ is shown formed on a strip 6, secured to the bottom of the member 2 on the outside thereof, so that the bottom wall of the member 1 may slide over the strip 6, and thus the corresponding grooves $1^a$ $2^a$ can be kept in alinement for the passage through them of one of the covers, and whereby also when the members are turned at an angle the end $1^c$ of the member 1 may slide over the strip 6, the end $2^c$ of the member 2 being shown cut away to permit the free swinging of the member 1. (See Fig.

3.) Thus an overlap-joint is provided at the junction or adjacent ends of the two members of the elbow in the various positions or angles to which they may be adjusted. Instead, however, of using the strip 6 the bottom wall of one of the members could be pressed into corresponding form to permit of maintaining a closed joint at the bottom, so that the end of one member could slide over the end of the other member for the purposes above indicated.

The side walls of the members 1 2 on one side thereof are continued about to the ends thereof adjacent to the pivot 5, while the opposite sides are cut away at $1^d 2^d$ sufficiently far to permit the pivotal movement of the members as they swing toward each other, and to maintain such cut-away parts closed in whatever position the members may be adjusted relatively to each other I provide a flexible strip 7, which extends between the ends of the corresponding side walls of the members and bridges the space there formed, as clearly shown in Figs. 3 and 4. The strip 7 thus forms a practical continuation of the side walls of the members 1 2, and by preference I secure the strip to one of such walls and permit it to have sliding connection with the other. For this purpose I have shown one end $7^a$ of the strip as passing through an opening in the side wall of the member 1 and bent back, to be held in place as shown in Fig. 3, and the opposite end is received in a guide or pocket 8 on the opposite member provided on the side wall thereof beneath the groove $2^a$. This guide or pocket may be formed in any suitable manner; but for convenience of manufacture I have shown it as formed by means of a strip 9, which passes under the bottom of the member 2 and is bent up along the outer wall thereof, as in Fig. 4, said strip being secured to the member 2, as by a rivet or otherwise. (See Fig. 5.) With this construction it will be understood that when the members 1 2 of the conduit are bent at a desired angle the strip 7 will likewise bend and will slide longitudinally of the member 2, and thus will at all times maintain closed the space between the corresponding ends of the sides of the members 1 2. The strip 7 thus also forms a guide for the wires that may be drawn through the elbow, and particularly in their passage around the corner formed at the junction of the two members of the elbow. By preference the end $2^f$ of the corresponding side wall of the member will be folded back, as indicated in Fig. 3, to provide a rounded edge for the wire to draw over. It will be understood that the covers 3 4 are adapted to overlap at their inner ends, as indicated in Fig. 1. Thus to whatever angle the members 1 2 may be adjusted the spaces that would be otherwise formed at the junction of the members are closed by the side walls of the members adjacent to the pivot 5, by the strip 7, by the overlapping bottoms of the members, and by the overlapping covers, the advantages of which will be obvious.

In Figs. 6, 7, and 8 the members 1 2 are shown pivoted centrally, as at $5^a$, the bottom of one member being shown overlapping the adjacent portion of the bottom of the other member, and the side walls near the bottom ends of the members are cut away, or, in other words, the bottoms of the members project for a distance beyond the ends of the side walls, whereby the members may be turned so far as a right angle in opposite directions or to the right and left of the longitudinal axis of either member. To maintain closed the spaces thus formed between the corresponding ends of the side walls of the members, I provide a strip 7 in line with each of the side walls and connect it to one of the members—as, for instance, the member 1—and I provide two guides or pockets 8 on the next member to receive said strips, as indicated in Fig. 6, and in this instance the strip 9 is shown passing up on both sides of the member 2, forming the two pockets 8. (See Fig. 8.) Thus, as the strips 7 are flexible, one will draw outwardly and the other will slide inwardly of the corresponding pocket as the members are turned on the pivot $5^a$, and the strips will bend to the proper positions, thus maintaining the side openings adjacent to the pivot 5 properly closed. The covers 3 4, that are located in the grooves $1^a 2^a$, are also adapted to overlap between the corresponding ends of the side walls of the members in whatever position the members may be adjusted. Thus the channel in the elbow is maintained in the form of a conduit closed for the protection of the contained wires, and the wires may be carried around the corner formed at the elbow in well-known manner.

Instead of having the members 1 2 swing laterally on a plane parallel to their bottom wall the members may be hinged so as to swing perpendicularly to such plane, as indicated in Figs. 9, 10, and 11. In this case the bottom walls of the members 1 2 are hinged together, as at $5^b$, to swing toward each other, and the corresponding adjacent ends of the side walls are beveled, as at $1^g 2^g$, so that the members may assume the position shown in Fig. 11, if desired, or a position at any angle intermediate the position shown in Fig. 11 and a right line. To prevent side openings being formed at the adjacent ends of the members 1 2 where the beveled edges $1^g 2^g$ occur in the various positions to which the members may be adjusted, I provide the ends of the side walls of the members respectively with overlapping projections $1^h 2^h$, which will maintain an overlapping condition in the various positions of adjustment of the members 1 2. (See Figs. 10 and 11.) The covers 3 4 are also adapted to overlap in the various positions of adjustment of the members 1 2, and, if desired, the end of one cover, as at $4^a$, may be bent to receive the end of the opposite cover, as indicated in Fig. 10, to further insure a tight closure above the channel within the elbow. The projecting portions $1^h\ 2^h$ may be formed directly on the side walls of members 1 2 by suitably bending the same or may be separate pieces fastened thereto.

In the various forms of my invention substantially the same result of permitting the members of the elbow to be placed at the desired angle to each other and maintaining a closed condition at the adjacent ends of the members is accomplished. The form of the members, such as the open top channel provided with the grooves to receive the covers, so that the latter may slide along the same, enables the elbow to be connected with conduits having a similar form, so that the wires from the conduit may be carried at varying angles around corners and the like; but my invention is not limited to the particular form of the members 1 2 shown and described nor to the particular manner of holding the covers upon the same, as the arrangements and details may be varied without departing from the spirit of my invention.

Having now described my invention, what I claim is—

1. An elbow of the character described comprising a pair of members each provided with a channel and pivotally connected together, covers for said members, and means for closing openings adjacent to the corresponding ends of the members in their different position of adjustment, substantially as described.

2. An elbow of the character described comprising a pair of members each provided with a channel, the side walls of the members having opposed grooves, said members being pivotally connected together, covers for said grooves adapted to overlap, and means for maintaining closed the openings at the adjacent ends of the members, substantially as described.

3. An elbow of the character described comprising a pair of members provided with channels, said members being pivotally connected together, the bottoms of said members being adapted to overlap, covers for said members, and means for maintaining closed openings at the adjacent ends of the members, substantially as described.

4. An elbow of the character described comprising a pair of members provided with channels, said members being pivotally connected together, covers for said members, and a strip or extension interposed between opposed cutaway portions of the sides of the members adapted to close the opening formed thereat, substantially as described.

5. An elbow of the character described comprising a pair of members having channels and pivotally connected together, covers for the members, the opposed side walls of the members being cut away providing an opening to permit the members to be placed at an angle to each other, a flexible strip secured to one of the members, and a guide for the opposite portion of said strip connected with the other member, whereby said strip may have longitudinal movement and may bend as required to close the side opening, and covers for said members, substantially as described.

6. An elbow of the character described comprising a pair of members having channels, a strip secured to the bottom of one member, and the bottom of the other member adapted to lap said strip, means for pivotally connecting said members so they may swing at an angle to each other, corresponding side walls of said members being adjacent to each other, and the corresponding opposite walls being cut away forming an opening in one side to permit said members to extend at an angle to each other, a flexible strip interposed between said members adapted to close said opening, and covers for said members, substantially as described.

7. An elbow of the character described comprising a pair of members having channels and pivotally connected together, covers for said members, opposed walls of said members being cut away forming an opening to permit said members to extend at an angle to each other, a flexible strip secured to one of the members and extending across said opening, and a guide for said strip consisting of a strip secured to the other member and extending along the wall thereof forming a pocket for the flexible strip, substantially as described.

GEO. A. LUTZ.

Witnesses:
T. F. BOURNE,
M. MANNING.